Patented May 17, 1938

2,117,813

UNITED STATES PATENT OFFICE 2,117,813

ANTHRAQUINONE DERIVATIVES

Walter Mieg, Opladen, Germany, assignor to General Aniline Works, Inc., New York, N. Y., a corporation of Delaware No Drawing. Application July 16, 1935, Serial No. 31,725. In Germany July 28, 1934

3 Claims. (Cl. 260—36)

The present invention relates to new anthraquinone derivatives.

I have found that new and valuable anthraquinone derivatives are obtainable by causing agents capable of splitting off hydrogen halide to react upon compounds of the type

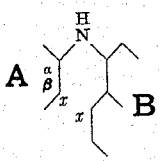

wherein A represents an anthraquinone radical, B represents a system of at least 2 condensed benzene rings, selected from the group consisting of the naphthaline, pyrene and perylene nuclei, one of the $x$'s stands for halogen and the other $x$ for hydrogen.

The anthraquinone residue and also the aromatic residue may contain substituents, such as halogen atoms, alkyl groups, alkoxy groups, benzylamino groups and so on. Obviously, the anthraquinone nucleus may contain a further substituent of the following type

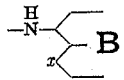

in the alpha-position to the other quinone oxygen (see Example 5) and, furthermore, another alpha-aminoanthraquinone radical may be attached in the same way as indicated above to the system B without departing from the sense of my invention (see Example 8). The compounds which are obtainable therefrom are intended to fall within the scope of the claims of this case.

As agents which are capable of eliminating hydrogen halide there may be preferably employed potassium carbonate in the presence of suitable solvents, such as nitrobenzene, or also alkali hydroxides in the presence of alcohols or phenols.

The new compounds which are obtainable in accordance with my present invention probably correspond to the following formula:—

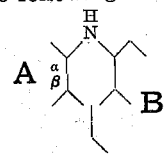

wherein A represents an anthraquinone nucleus and B represents a system of at least 2 condensed benzene rings. These new products are valuable vat dyestuffs and can be used either per se or as intermediates for the preparation of new dyestuffs. The particular properties of these products lead to the supposition that they are not carbazole derivatives, which is proved by the fact that such alpha-naphthylamine derivatives are also capable of undergoing the above described reaction as contain a methyl group in beta-position (see Example 4).

The following examples will illustrate the invention, without, however, restricting it thereto, the parts being by weight:—

Example 1

A mixture of 10 parts of 1.1'-naphthylamino-2-bromo-anthraquinone, 10 parts of potassium carbonate and 100 parts of nitrobenzene is heated to boiling while stirring until the solution has assumed a clear green solution. After cooling the compound separates in bluish-green crystals probably of the formula:—

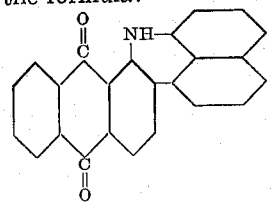

It dissolves rather difficultly in high boiling solvents, such as ortho-dichlorobenzene or pyridine at the boiling point of the latter with a greenish-blue, in cold 98% sulfuric acid at first with an olive coloration, which very quickly turns to brown and brownish-red. It dyes cotton and wool from a red vat greenish-blue shades.

Example 2

5 parts of 1.1'-naphthylamino-8'-chloroanthraquinone are introduced into a solution of 10 parts of potassium hydroxide in 50 parts of amyl alcohol and boiled for several hours under the reflux condenser, until a test portion diluted with methyl alcohol yields on stirring in the open air a bluish-green precipitate. For oxidation of the leuco compound first formed, the cooled melt is stirred, advantageously after the addition of 30 parts of methyl alcohol, for some time in the open air. The reaction product separated can be crystallized for purification from nitrobenzene or pyridine. It is most probably identical with the compound obtainable according to the method of Example 1.

*Example 3*

A solution of 4 parts of 1.1'-naphthylamino-2'-methyl-2-bromoanthraquinone and 6 parts of potassium hydroxide in 30 parts of amyl alcohol is heated to gentle boiling for 1 to 2 hours while stirring, until the starting material has completely disappeared. The partly separated red leuco compound of the reaction product can be oxidized as described in Example 2. The compound thus obtained corresponds probably to the formula:—

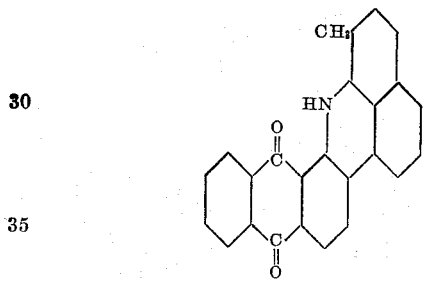

The new compound separates from its greenish-blue solution in hot pyridine in black-blue crystals, which are soluble in cold concentrated sulfuric acid with an olive-green coloration.

Cotton and wool are dyed with this dyestuff somewhat more greenish shades than those obtained with the dyestuff of Example 1 or 2.

*Example 4*

10 parts of 1.1'-naphthylamino-2'-methyl-2-bromoanthraquinone and 15 parts of potassium hydroxide are heated to boiling for a short time with 100 parts of phenol until a test portion oxidized in the air yields a clear bluish-green precipitate. The cooled melt is diluted with alcohol of about 50% strength and stirred in the open air until the leuco compound still present is completely oxidized. The compound thus obtained is most probably identical with the reaction product of Example 3.

*Example 5*

4 parts of the compound of the following formula:—

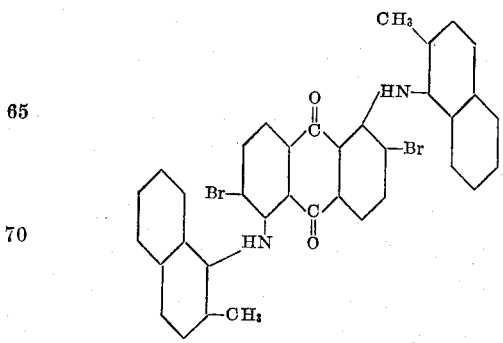

(obtainable by substituting the alpha-bromo atoms in 1.2.5.6-tetrabromoanthraquinone by the 1-amino-2-methylnaphthalene residue) are heated for a short time to about 125° C. with a solution of 6 parts of potassium hydroxide in 60 parts of amyl alcohol, until a test portion yields a deep green precipitate on shaking in the open air. For working up the red leuco compound formed first is oxidized by atmospheric oxygen, whereby a reaction product of the following probable formula:—

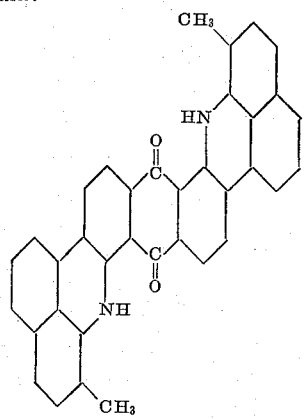

is separated. It is soluble in cold concentrated sulfuric acid with an olive brown coloration and rather difficultly soluble in boiling nitrobenzene with a clear green coloration. Cotton is dyed dark green shades.

*Example 6*

6 parts of the compound obtainable from 1-benzamido-3.4-dibromoanthraquinone by substituting the 4-bromo-atom by the 1-amino-2-methylnaphthalene residue, are heated to boiling and while stirring for 1 to 2 hours with a 12% solution of potassium hydroxide in amyl alcohol. The melt is cooled and diluted with alcohol whereupon air is introduced until the red leuco compound formed first is completely oxidized. The product thus obtained, in which the benzamino group is saponified, is again benzoylated after drying by heating it with benzoylchloride. The benzoyl compound thus obtained having the probable formula:—

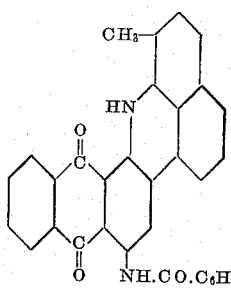

dissolves with brownish-red coloration in concentrated sulfuric acid and dyes cotton fast yellowish-green shades.

*Example 7*

60 parts of 3-aminopyrene, 40 parts of 1.2-dibromoanthraquinone, 36 parts of the potassium salt of acetic acid, 1.5 parts of copper acetate and 0.5 part of copper are stirred for some hours in a carbon dioxide atmosphere and at a temperature of 105–110° C. with 500 parts of amyl alcohol. After cooling, the precipitated 1.3'-aminopyrenyl-2-bromoanthraquinone is filtered off and freed from the impurities in the usual manner; it forms crystals which are soluble in pyridine with a violet coloration.

6 parts of the compound thus obtained are boiled for some hours while stirring with 60 parts of nitrobenzene and 6 parts of potassium carbonate, until the solution being firstly violet-red, has assumed a clear green coloration. On cooling there are separated green leaflets, which are mixed with small amounts of brownish-yellow needles, the latter being most probably due to a carbazole ring closure. They may be removed by fractionating from nitrobenzene, wherein they are more easily soluble.

The compound of the following formula is thus obtained:

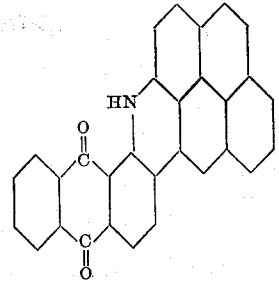

forming green crystals, which dissolve in cold, concentrated sulfuric acid with an olive green coloration and with a clear green coloration in boiling pyridine or nitrobenzene.

*Example 8*

A mixture of 4 parts of 1.5-naphthylene diamine, 9 parts of potassium acetate, 0.5 part of copper acetate and 0.2 part of copper powder is added to a boiling solution of 20 parts of 1.2-dibromoanthraquinone in 200 parts of amyl alcohol and the whole is heated to boiling for 3 to 4 hours while stirring.

After cooling the reaction product, which is formed by the condensation of 1 mol. of 1.5-naphthylenediamine with 2 mols of 1.2-dibromoanthraquinone, is filtered off, and crystallized from nitrobenzene for purification. It forms dark violet small crystals.

4 parts of the compound thus obtained are boiled for some time with 6 parts of potassium carbonate in 60 parts of quinoline while stirring, until the melt has assumed an olive green coloration. After cooling the reaction product is sucked off, washed with alcohol and water and for purification boiled again with a large amount of nitrobenzene. Blackish green crystals are thus obtained, which dissolve in concentrated sulfuric acid with an olive brown coloration and dye cotton olive shades.

The new compounds correspond to the probable formula:—

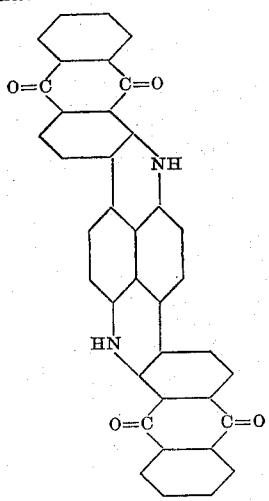

I claim:—

1. The products which are substantially identical with those obtainable by the process which comprises causing agents capable of splitting off hydrogen halide to react upon compounds of the type

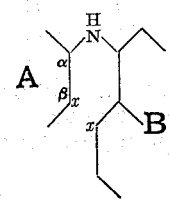

wherein A represents an anthraquinone radical, B represents a system of at least two condensed benzene rings selected from the group consisting of naphthalene and pyrene nuclei and one of the x's stands for halogen, the other x for hydrogen, the said compounds having the probable formula

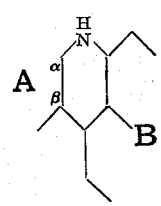

wherein A and B have the above meaning, and being vat dyestuffs of good fastness properties.

2. The products which are substantially identical with those obtainable by the process which comprises causing agents capable of splitting off hydrogen halide to react upon compounds of the type

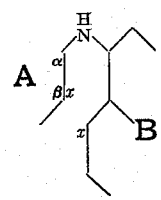

wherein A represents an anthraquinone radical, B represents a naphthalene nucleus and one of the x's stands for halogen, the other x for hydrogen, the said compounds having the probable formula

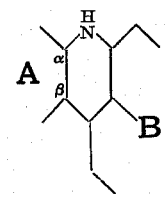

wherein A and B have the above meaning, and being vat dyestuffs of good fastness properties.

3. The products which are substantially identical with those obtainable by the process which comprises causing agents capable of splitting off hydrogen halide to react upon compounds of the type
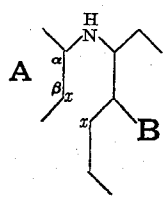
wherein A represents an anthraquinone radical, B represents a pyrene radical and one of the $x$'s stands for halogen, the other $x$ for hydrogen, the said compounds having the probable formula
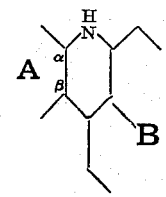
wherein A and B have the above meaning, and being vat dyestuffs of good fastness properties.
WALTER MIEG.